United States Patent [19]
Meredith, Jr. et al.

[11] Patent Number: 5,200,855
[45] Date of Patent: Apr. 6, 1993

[54] ABSORBING DICHROIC FILTERS

[75] Inventors: William A. Meredith, Jr.; Paul M. LeFebvre, both of Santa Rosa, Calif.

[73] Assignee: Optical Coating Laboratory, Inc., Santa Rosa, Calif.

[21] Appl. No.: 728,882

[22] Filed: Jul. 12, 1991

[51] Int. Cl.$^5$ .............................................. G02B 5/28
[52] U.S. Cl. .................................. 359/588; 359/589
[58] Field of Search ................ 359/586, 588, 589, 890

[56] References Cited

U.S. PATENT DOCUMENTS

| | | | |
|---|---|---|---|
| 2,379,790 | 7/1945 | Dimmick | 359/586 |
| 3,649,359 | 3/1972 | Apfel et al. | 359/587 |
| 3,771,857 | 11/1973 | Thomasson et al. | 359/587 |
| 3,914,464 | 10/1975 | Thomasson et al. | 359/890 |
| 3,981,568 | 9/1976 | Bartolomei | 359/587 |
| 4,029,394 | 6/1977 | Araki | 359/590 |
| 4,047,805 | 9/1977 | Sekimura | 359/586 |
| 4,355,866 | 10/1982 | Tanaka et al. | 359/590 |
| 4,431,695 | 2/1984 | Flatscher | 359/590 |
| 4,659,178 | 4/1987 | Kyogoku | 359/590 |
| 4,940,636 | 7/1990 | Brock et al. | 359/586 |

FOREIGN PATENT DOCUMENTS 86006423 6/1986 Fed. Rep. of Germany .

Primary Examiner—Carolyn E. Fields
Assistant Examiner—Drew A. Dunn
Attorney, Agent, or Firm—Philip A. Dalton

[57] ABSTRACT

High purity (95-99.5 percent) red, orange and yellow filters are disclosed which comprise a periodic stack of relatively low index of refraction dielectric material (L) such as $SiO_2$ or $MgF_2$ and absorbing relatively high index material such as silicon or $Fe_2O_3$. Together, the low and high index materials provide a high index ratio (typically 1.7 to 2.5). The filters are fabricated according to designs such as $(H/2\ L\ H/2)^n$, typically using only 5 to 7 layers. Despite the very small layer count, these filters provide overall optical performance which is at least the equivalent of all-dielectric filters of 30 or more layers, with color purity that is unachievable by all-dielectric filters and simple low cost design. In addition, our filters have inherently low stress levels and absorb and reflect unwanted light such as blue light. As a consequence, the filters are ideally suited for coating on flexible substrates such as plastics and for coating on lamp envelopes to form red or yellow bulbs which are ideally suited, for example, for use as automobile tail light bulbs, side marker bulbs and turn signal bulbs.

12 Claims, 2 Drawing Sheets

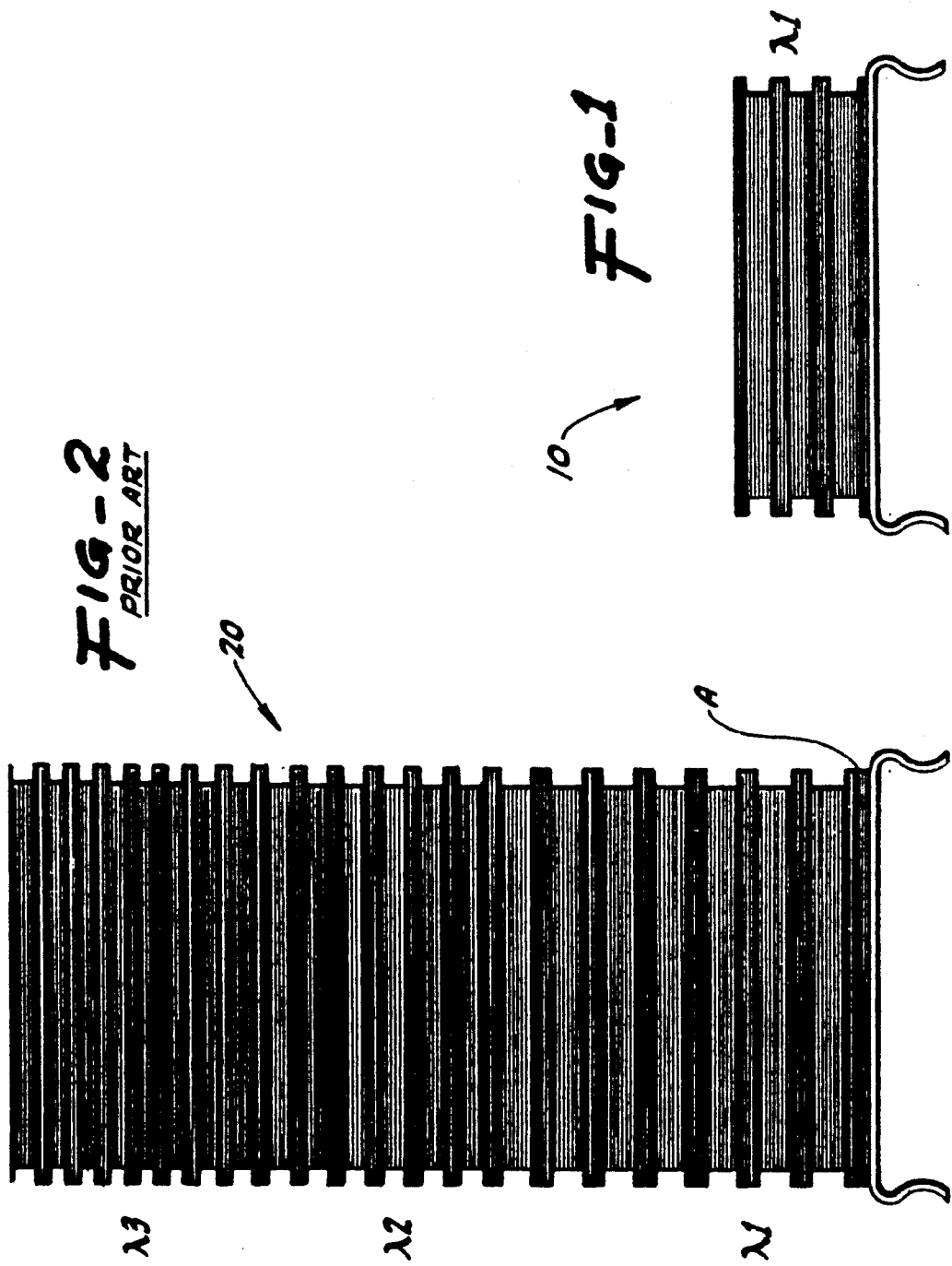

ABSORBING DICHROIC FILTERS

BACKGROUND OF THE INVENTION

1. Field of the Invention

Our present invention relates to optical filter coatings and to processes for making such coatings; to red, orange and yellow dichroic filters; to processes for coating such filters on flexible substrates and on lamp envelopes; and to red, orange and yellow bulbs used, for example, in emergency lights, and in automobile tail lights, turn signal lights and side marker lights.

2. Description of the Related Art

It is a conventional practice in the optical coating industry to form red, orange or yellow dichroic filters of a periodic stack of alternating low index (L) and high index (H) layers of transparent dielectric materials having a relatively low index ratio of about 2.2/1.46. Using the dielectric materials $SiO_2$ or $MgF_2$ (L) and $TiO_2$, $Ta_2O_5$, ZnS, $ZrO_2$, $HFO_2$, etc. (H), the two stack construction and $(H/2\ L\ H/2)^n$ at $\lambda_2$, with $n = 6, 7$ or $8$ and positioning $\lambda_1$ and $\lambda_2$ appropriately in the visible spectrum, one can position the cut-on wavelength (the wavelength between regions of high reflectance and high transmittance) to yield an appropriate transmitted color, i.e., to reflect unwanted wavelengths and transmit the wavelength of the desired color. For yellow filters, typically only one stack of about 16 layers is required. However, the necessary layer count is about 25 for orange filters and about 30–40 for red filters. Because of this large number of layers, these filters are time consuming and expensive to build.

In addition, these filters typically have high intrinsic stress due to the high layer count. The high stress levels make these types of filters unsuitable to coating on such substrates as flexible plastic films. These filters also are very sensitive to incidence angle because of the property of all dielectric materials to shift to shorter wavelengths with increased angles. The sensitivity to high incidence angles occurs for example in lamp envelopes having a red or orange dielectric dichroic filter coating. Characteristically, blue-green light is reflected internally until the light strikes the envelope and filter at a high angle, at which point the light is transmitted through the filter and degrades/desaturates the orange or red color. Because of the stress inherent in coatings containing as many as 30 layers (red filters), and as many as 40–45 layers (blue-corrected red filters), and because of the sensitivity to high incidence angles, all-dielectric filters are difficult or impossible to build on substrates such as lamp envelopes or flexible substrates, and provide unacceptable performance and cost.

N.V. Philips German Patent Document 8600642 (Rollennummer) discloses a blue energy. absorbing yellow lamp filter design which incorporates a single very thin blue-absorbing layer on the lamp envelope and many all dielectric periods on top to reject light. The all dielectric filter coating comprises the conventional long wave stack $(H/2\ L\ H/2)^n$, where $n = 5$ or $6$. and, where L is $SiO_2$, and H is a material such as $TiO_2$ or $Ta_2O_5$. The absorbing material is very thin, 5–6 nm, to prevent loss of visible light output while attenuating only the blue region of the visible spectrum.

However, any attempt to achieve the automobile industry standards for color purity for orange or red using the 8600642 design approach would still require up to 30 layers on top of the absorbing material. It is submitted that even such a many-layered coating could not achieve the purity required to meet the industry standard for these colors because of light leakage in the green region of the spectrum. Regardless, even if such purity were attainable, the fabrication process would be lengthy and not cost effective and the resulting coating would be extremely angle sensitive. In short, it is believed the filter would not be suitable for lamp applications.

SUMMARY OF THE INVENTION

In one aspect, our invention is embodied in a dichroic filter and process, which comprises a periodic stack of relatively low index material (L) and relatively high index material (H), and in which one of the materials has metal-like properties in a relatively short wavelength region of the electromagnetic spectrum and dielectric properties in a relatively longer wavelength region of the electromagnetic spectrum, for selectively transmitting light in a selected region of that spectrum. In a preferred embodiment, the stack is of long wave pass construction, L has dielectric properties and H has metal-like properties, for selectively transmitting light in the orange-to-red region of the visible spectrum.

In another aspect, our invention is embodied in a filter design and fabrication process which overcome the above-described problems of conventional all-dielectric dichroic filters. The design is a long wave pass dichroic filter, which comprises a periodic stack of relatively low index dielectric material and absorbing, relatively high index material, for selectively transmitting light in the orange-to-red region of the spectrum.

Preferably, the index ratio is about 1.7 to about 2.5. Also, the relatively low index dielectric material, L, is selected from silicon dioxide and magnesium fluoride, and the absorbing, relatively high index material, H, is selected from silicon and iron oxide. Most preferably, L is silicon dioxide and H is iron oxide, or L is silicon dioxide and H is silicon. Unlike all dielectric materials disclosed earlier, silicon and iron oxide materials have metal-like properties on the short wavelength side of the visible spectrum and dielectric-like properties on the long wavelength side of the visible spectrum. Silicon monoxide, SiO, or other materials in addition to Si and $Fe_2O_3$ that exhibit these properties could be applied. The preferred long wave pass filter construction is the single stack $(H/2\ L\ H/2)^n$ where $n = 2$ (5 layers) or $3$ (7 layers) and does not require a separate material or layer to absorb shorter wavelengths Collectively, the above construction criteria provide high purity, low stress red, orange and yellow filters using as few as five to seven layers. This is in distinct contrast to the many-layer construction and lesser optical performance of all-dielectric filters and of the blue-corrected filters of the type disclosed in the Phillips patent.

Our design is also applicable to filters other than the presently preferred yellow/orange/red lamp applications. For example, the design applies to flexible substrates used in stage studio lighting applications or other red/orange filter applications.

BRIEF DESCRIPTION OF THE DRAWING

The above and other aspects of our invention are described relative to the drawing, in which:

FIG. 1 schematically depicts the layered construction of a filter which embodies our invention;

FIG. 2 schematically depicts the layered construction of a conventional all dielectric filter.

DETAILED DESCRIPTION OF THE PREFERRED EMBODIMENT(S)

Figure 3:
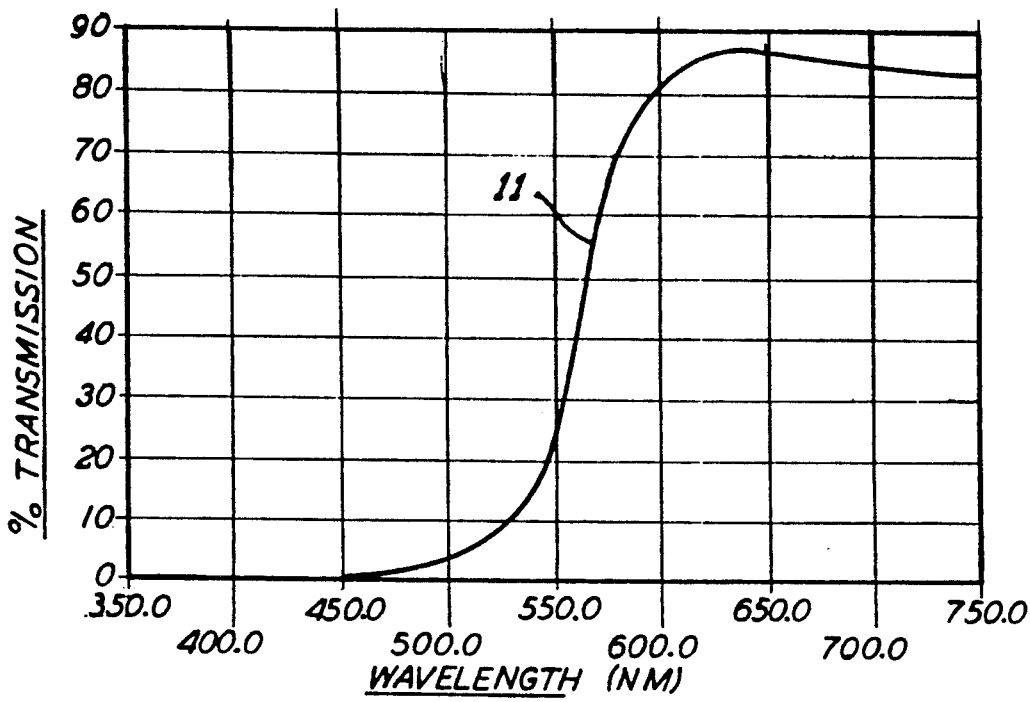
FIGS. 3 and 4 depict transmittance as a function of wavelength over the visible spectrum for orange and red filter coatings formed on lamps according to our present invention.

Our invention is embodied in a dichroic filter utilizing a relatively low index dielectric material (L) and an absorbing relatively high index material (H). The presently preferred filter design has the single stack or period structure $(H/2\ L\ H/2)^n$ where preferably n = 2 or 3. The H materials used here provide high absorption on the short wavelength side of the passband. The high index ratio provided by the L and H materials imparts a sharp cut-on at the long wavelength side of the rejection band in only a few layers.

Suitable materials for the absorbing high index layer must be at least partially transmissive in the visible region for the types of thicknesses ... typically 50 to 100 nm (nanometers) ... used for visible optical filters. The shape of the absorption curve is a key factor in choosing an appropriate material for a given color filter. Using the appropriate material, our design will effectively block (both reflect and absorb) all wavelengths below a specified cut-on value. This type of design will also give a steep cut-on edge due to the high value of the ratio, $n_h/n_l$, of the index of refraction. $n_h$, of the high index of refraction material (H) relative to the index of refraction, $n_l$, of the low index of refraction material (L). Typically, this high index ratio is about 1.7 to about 2.5, as compared to all dielectric stacks, whose index ratios typically are about 1.5 or less. The level of transmission in the pass band is dictated primarily by the amount of residual absorption in the high index material in this region.

Suitable absorbing, relatively high index materials include silicon and iron oxide (e.g., $Fe_2O_3$). Suitable dielectric, relatively low index materials include silicon dioxide ($SiO_2$) and magnesium fluoride ($MgF_2$). As mentioned, other materials can be used which have metal-like properties on the short wavelength side of the visible spectrum and dielectric properties on the long wavelength side of the visible spectrum. Also, either the L or H material can be absorbing. For example, L can be the absorbing material silicon monoxide (SiO).

Using the preferred long wavepass filter design $(H/2\ L\ H/2)^n$ where preferably n = 2 or 3, L and H materials selected as described above, and extremely low layer counts of 5 to 7, we have constructed red and orange filters whose transmitted color and purity are equivalent to all-dielectric dichroic filters having layer counts greater than or equal to 30-45. The advantages of our filter and the process of forming it also include the following. First, complementary (unwanted) wavelengths are reflected and absorbed by the main stack itself. As a result, unwanted light such as blue-green light is suppressed (reflected and absorbed) and the spectral operation is well suited to lamp coatings. The level of absorption of unwanted wavelength is greatly increased over the approach disclosed in the Philips patent, with no compromise in brightness. Second, because of the low layer count, the filter is characterized by very low stress —typically, about 5 KPSI for a layer count of 5 to 7, as compared to 50 KPSI - 100 KPSI for 35 to 40 layers. As a consequence, the filter coating is well suited to deposition on flexible substrates such as thin plastic substrates and to deposition on curved substrates such as lamp or bulb envelopes. Third, our design requires much less time to form the filter. The extremely low layer count requires proportionately less time to deposit the filter coating. Also, the high index of the absorbing materials requires only a fraction of the deposition time of traditional "high" index materials used in the all-dielectric filter design approach.

FIG. 1 is a schematic representation 10 of our new red filter design. The filter 10 comprises:

Substrate | $[H/2\ L\ H/2]^3_{\lambda 1}$, where H is absorbing high index material and layer L is dielectric material. Our illustrated filter uses 7 layers.

FIG. 2 is a schematic representation 20 of a conventional all-dielectric red filter design. The system 20 comprises the design:

Substrate | A $[H/2\ L\ H/2]^7_{\lambda 1} [H/2\ L\ H/2]^7_{\lambda 2} [H/2\ L\ H/2]^7_{\lambda 3}$, where A is the absorbing layer and H and L are dielectrics. In contrast to the very low, seven layer count used in our filter, the layer count of the conventional filter 20 is 46.

EXAMPLE

Figure 4:
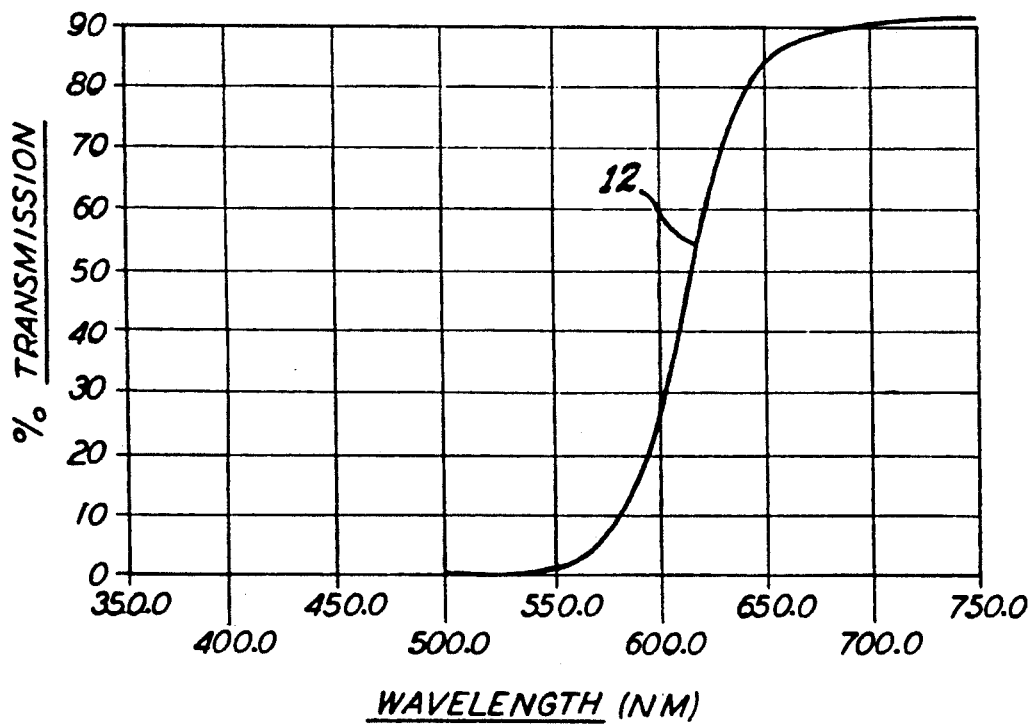

Orange and red dichroic filters were constructed using the design $(H/2\ L\ H/2)^3$, where L is the relatively low index dielectric material $SiO_2$, H is the relatively high index absorbing material $Fe_2O_3$, the filter contains 7 layers, and the ratio $n_H/n_L = 3.0/1.4$. As shown by curve 11 in FIG. 3, the orange filter provided a sharp cut-off at about 565 nm and was also characterized by very low transmission approaching 0 percent of light below about 500 nm. Referring to curve 12 in FIG. 4, the red filter exhibited both a sharp cut-on at about 610 nm and very low transmission approaching 0 percent below about 550 nm.

Orange and red filters constructed of our single stack design $(H/2\ L\ H/2)^3$, using L = $SiO_2$ and H = $Fe_2O_3$, transmitted light of purity 95-99.5 percent over the dominant wavelength range of 595-625 nm. (The track was determined from a CIE diagram taken in the region of the near-100% purity green/red line, closely adjacent the red end of the line.) In theory, an orange and red single stack filter of design $(H/2\ L\ H/2)^3$ using L = $SiO_2$ and H = silicon will also provide purities of 95-99.5 percent over the dominant wavelength of 595 to 675 nm.

Please note, the above description and examples are given to illustrate the utility of our invention in forming red, orange and yellow, absorbing dichroic filters of superior physical characteristics and optical performance. However, our invention is not limited to the specific design of the exemplary filters. Rather, in view of the above-described preferred and alternative embodiments of our present invention and the specific working examples of such filters, those of usual skill in the art will readily modify and adapt and extend the filter design and fabrication in ways which are within the scope of the appended claims.

What is claimed is:

1. A dichroic filter, comprising a periodic stack of relatively low index of refraction material (L) and relatively high index of refraction material (H), one of the materials having metal-like properties in a relatively short wavelength region of the visible spectrum and one of the materials having dielectric properties in a relatively longer wavelength region of the visible spectrum, the materials providing a cut-on transition from metal-like absorption to dielectric transmission at the relatively longer wavelength region, for selectively transmitting light in a selected region of the longer wavelength region of the visible spectrum.

2. The filter of claim 1, wherein the stack is of long wave pass construction, L has dielectric properties and H has dielectric and metal-like properties, for selectively transmitting light in the orange-to-red region of the visible spectrum.

3. The filter of claim 2, wherein the index ratio defined by the ratio of the indices of refraction of the relatively high index H material and the relatively low index L material is about 1.7 to about 2.5.

4. The filter of claim 1, 2 or 3, wherein L is selected from silicon dioxide and magnesium fluoride, and H is selected from silicon and iron oxide.

5. The filter of claim 1, 2 or 3, wherein L is silicon dioxide and H is iron oxide.

6. The filter of claim 1, 2 or 3, wherein L is silicon dioxide and H is silicon.

7. The filter of claim 1, 2 or 3, wherein the filter construction is $(H/2\ L\ H/2)^n$.

8. The filter of claim 1, 2 or 3, wherein the filter construction is $(H/2\ L\ H/2)^n$, n is selected from 2 and 3, and comprises five to seven layers.

9. The filter of claim 8, wherein L is silicon dioxide and H is iron oxide.

10. The filter of claim 8, wherein L is silicon dioxide and H is silicon.

11. The filter of claim 1, 2 or 3, wherein the filter construction is $(H/2\ L\ H/2)^n$, n is selected from 2 and 3, and comprises five to seven layers, L is selected from silicon dioxide and magnesium fluoride, and H is selected from silicon and iron oxide.

12. The filter of claim 1, 2 or 3, wherein the filter construction is $(H/2\ L\ H/2)^n$, L is selected from silicon dioxide and magnesium fluoride, and H is selected from silicon and iron oxide.

* * * * *